United States Patent
Wang et al.

(10) Patent No.: US 12,475,684 B2
(45) Date of Patent: Nov. 18, 2025

(54) HIGH AND LOW FREQUENCY FEATURE MAP GENERATION FOR H AND E PATHOLOGY IMAGES

(71) Applicant: Leica Biosystems Imaging, Inc., Vista, CA (US)

(72) Inventors: Ji Wang, Plainsboro, NJ (US); Chad Salinas, Rancho Santa Fe, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 351 days.

(21) Appl. No.: 18/115,082

(22) Filed: Feb. 28, 2023

(65) Prior Publication Data
US 2023/0298320 A1      Sep. 21, 2023

Related U.S. Application Data

(60) Provisional application No. 63/268,680, filed on Feb. 28, 2022.

(51) Int. Cl.
*G06V 10/764*    (2022.01)
*G06T 3/40*      (2006.01)
(Continued)

(52) U.S. Cl.
CPC ............ *G06V 10/771* (2022.01); *G06T 3/40* (2013.01); *G06T 7/0012* (2013.01); *G06T 7/12* (2017.01);
(Continued)

(58) Field of Classification Search
None
See application file for complete search history.

(56) References Cited

U.S. PATENT DOCUMENTS 6,213,958 B1 * 4/2001 Winder ............... A61B 8/42
                                            600/442
11,436,491 B2 * 9/2022 Bharadwaj ............ G06N 3/08
(Continued)

OTHER PUBLICATIONS

Araújo, Teresa, et al. "Classification of breast cancer histology images using convolutional neural networks." *PloS one* 12.6 (2017): e0177544.
(Continued)

*Primary Examiner* — Tsung Yin Tsai
(74) *Attorney, Agent, or Firm* — FROST BROWN TODD LLP

(57) ABSTRACT

An apparatus and methods for determining features in an image of a Hematoxylin and Eosin (H&E) stained tissue sample. An apparatus can be configured to apply a machine learning model to the H&E stained tissue sample image to determine features in the image. Applying the machine learning model can include performing convolution operations on the H&E stained tissue sample image to generate a plurality of initial feature maps, applying octave-convolution-first-layer operations on the initial feature maps to generate initial high-frequency feature maps and low-frequency feature maps, applying octave-convolution operations on the high-frequency initial feature maps to generate refined high-frequency feature maps, applying octave-convolution operations on the low-frequency initial feature maps to generate refined low-frequency feature maps, and applying octave-convolution last layer operations on the refined high-frequency feature maps and the refined low-frequency feature maps to produce combined feature maps.

20 Claims, 12 Drawing Sheets

(51) Int. Cl.
  *G06T 7/00* (2017.01)
  *G06T 7/12* (2017.01)
  *G06V 10/771* (2022.01)
(52) U.S. Cl.
  CPC .. *G06V 10/764* (2022.01); *G06T 2207/20084* (2013.01); *G06T 2207/30024* (2013.01)

(56) References Cited

U.S. PATENT DOCUMENTS

| | | | |
|---|---|---|---|
| 11,443,535 B2 * | 9/2022 | Chen | G06V 30/153 |
| 2020/0388029 A1 * | 12/2020 | Saltz | G06V 10/267 |
| 2021/0004627 A1 * | 1/2021 | Chen | G06V 20/63 |
| 2021/0287083 A1 * | 9/2021 | Bharadwaj | G06N 3/08 |
| 2021/0357730 A1 * | 11/2021 | Han | G06N 3/063 |
| 2022/0162708 A1 * | 5/2022 | Bisht | C12Q 1/6809 |
| 2022/0327692 A1 * | 10/2022 | Park | G06T 7/0012 |

OTHER PUBLICATIONS

Müller, Sabine, Joachim Weickert, and Norbert Graf. "Robustness of brain tumor segmentation." *Journal of Medical Imaging* 7.6 (2020): 064006-064006.
Extended European Search Report and Written Opinion dated Jun. 29, 2023, for Application No. 23158897.1, 9 pages.

* cited by examiner

HIGH AND LOW FREQUENCY FEATURE MAP GENERATION FOR H AND E PATHOLOGY IMAGES

This application claims the benefit of and priority to U.S. Provisional Patent Application Ser. No. 63/268,680, filed Feb. 28, 2022, entitled "Feature Map Generation for H&E Pathology Images," the disclosure of which is incorporated by reference herein.

BACKGROUND

Technical Field

The described technology relates processing images of tissue samples to determine features, and in particular, to generating feature maps from images of stained tissues samples using a convolutional neural network.

SUMMARY

The systems, methods, and devices described herein each have several aspects, no single one of which is solely responsible for its desirable attributes. Without limiting the scope of this disclosure, several non-limiting features will now be discussed briefly. The methods and techniques described herein relate to systems and methods for determining feature information from images of Hematoxylin and Eosin (H&E) stained tissue sample. Tissue samples can be stained using a H&E staining protocol which allows features in the tissue sample to be more discernible. The tissue samples are imaged to produce digital representations of the H&E stained tissue sample. A plurality of the tissue samples can be used to train a machine learning model to generate feature maps depicting features of the tissue samples. A machine learning model can use a convolutional neural network (CNN) that implements octave convolution to increase the speed of the processing and efficiency of the computers used to run the machine learning model.

As described herein, one innovation includes an apparatus for determining features in an image of a Hematoxylin and Eosin (H&E) stained tissue sample, comprising a non-transitory computer readable medium configured to store executable instructions, and to store a H&E stained tissue sample image; one or more hardware processors in communication with the computer storage medium, wherein the executable instructions, when executed by the one or more hardware processors, configure the one or more hardware processors to: apply a machine learning model to the H&E stained tissue sample image, the machine learning model including at least a feature extractor network, wherein applying the machine learning model includes at least: performing convolution operations on the H&E stained tissue sample image to generate a plurality of initial feature maps; applying octave-convolution-first-layer operations on the initial feature maps to generate initial high-frequency feature maps and low-frequency feature maps; applying octave-convolution operations on the high-frequency initial feature maps to generate refined high-frequency feature maps; applying octave-convolution operations on the low-frequency initial feature maps to generate refined low-frequency feature maps; and applying octave-convolution last layer operations on the refined high-frequency feature maps and the refined low-frequency feature maps to produce combined feature maps.

Various embodiments can include additional features. For example, in some embodiments the machine learning model further includes determining classifications of the features in the combined feature maps. In some embodiments, the classification comprises semantic segmentation. In some embodiments, the spatial resolution of the initial low-frequency feature maps is ½ the spatial resolution of the initial high-frequency feature maps. In some embodiments, applying the machine learning model further comprises performing pooling operations to generate the low-frequency feature maps. In some embodiments, applying octave-convolution last layer operations on the refined high-frequency feature maps and the refined low-frequency feature maps to produce combined feature maps comprises pooling information from the refined high-frequency feature maps and the refined low-frequency feature maps to produce combined feature maps. In some embodiments, applying octave-convolution last layer operations comprises exchanging information between the refined high-frequency feature maps and the refined low-frequency feature maps by pooling and upsampling. In some embodiments, applying octave-convolution last layer operations on the refined high-frequency feature maps and the refined low-frequency feature maps to produce combined feature maps comprises providing information from at least one refined high-frequency feature map to a refined low-frequency feature map by pooling. In some embodiments, applying octave-convolution last layer operations on the refined high-frequency feature maps and the refined low-frequency feature maps to produce combined feature maps comprises communicating information from at least one refined low-frequency feature map to a refined high-frequency feature map by upsampling. In some embodiments, the machine learning process is implemented in a neural network. In some embodiments, the neural network includes a convolutional neural network. In some embodiments, the convolutional neural network is implemented as a residual neural network (ResNet), a DenseNet neural network, a U-Net neural network, or a visual geometry group (VGG) neural network.

Another innovation includes a non-transitory computer readable medium for determining features in an image of a Hematoxylin and Eosin (H&E) stained tissue sample, the computer readable medium having program instructions for causing a hardware processor to perform a method of: applying a machine learning model to an H&E stained tissue sample image, the machine learning model including at least a feature extractor network, wherein applying the machine learning model includes at least: performing convolution operations on the H&E stained tissue sample image to generate a plurality of initial feature maps; applying octave-convolution-first-layer operations on the initial feature maps to generate initial high-frequency feature maps and low-frequency feature maps; applying octave-convolution operations on the high-frequency initial feature maps to generate refined high-frequency feature maps; applying octave-convolution operations on the low-frequency initial feature maps to generate refined low-frequency feature maps; and applying octave-convolution last layer operations on the refined high-frequency feature maps and the refined low-frequency feature maps to produce combined feature maps. In some embodiments the method further comprises determining classifications of the features in the combined feature maps. In some embodiments, the classification comprises semantic segmentation. In some embodiments, the spatial resolution of the initial low-frequency feature maps is ½ the spatial resolution of the initial high-frequency feature maps. In some embodiments, applying octave-convolution-first-layer operations on the initial feature maps to generate initial high-frequency feature maps and low-frequency feature maps comprises performing pooling operations to generate the low-frequency feature maps. In some embodiments, applying octave-convolution last layer operations on the refined high-frequency feature maps and the refined low-frequency feature maps to produce combined feature maps comprises pooling information from the refined high-frequency feature maps and the refined low-frequency feature maps to produce combined feature maps. In some embodiments, applying octave-convolution last layer operations comprises exchanging information between the refined high-frequency feature maps and the refined low-frequency feature maps by pooling and upsampling. In some embodiments, applying octave-convolution last layer operations on the refined high-frequency feature maps and the refined low-frequency feature maps to produce combined feature maps comprises providing information from at least one refined high-frequency feature map to a refined low-frequency feature map by pooling. In some embodiments, applying octave-convolution last layer operations on the refined high-frequency feature maps and the refined low-frequency feature maps to produce combined feature maps comprises communicating information from at least one refined low-frequency feature map to a refined high-frequency feature map by upsampling. In some embodiments, the machine learning model is implemented in a neural network. In some embodiments, the neural network includes a convolutional neural network. In some embodiments, the convolutional neural network is implemented as a residual neural network (ResNet), a DenseNet neural network, a U-Net neural network, or a visual geometry group (VGG) neural network.

Another innovation includes a method for determining features in an image of a Hematoxylin and Eosin (H&E) stained tissue sample using a machine learning model including at least a feature extractor network, the method comprising: performing convolution operations on the H&E stained tissue sample image to generate a plurality of initial feature maps; applying octave-convolution-first-layer operations on the initial feature maps to generate initial high-frequency feature maps and low-frequency feature maps; applying octave-convolution operations on the high-frequency initial feature maps to generate refined high-frequency feature maps; applying octave-convolution operations on the low-frequency initial feature maps to generate refined low-frequency feature maps; and applying octave-convolution last layer operations on the refined high-frequency feature maps and the refined low-frequency feature maps to produce combined feature maps, wherein the method is performed by one or more computer hardware processors executing program instructions stored on a non-transitory computer medium.

BRIEF DESCRIPTION OF THE DRAWINGS

The features and advantages of the systems and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

DETAILED DESCRIPTION OF CERTAIN INVENTIVE ASPECTS

The methods and techniques described herein relate to systems and methods for determining feature information from images of Hematoxylin and Eosin (H&E) stained tissue sample. As described in further detail in reference to FIGS. 7A-7E, applying a machine learning model may include receiving an image of a H&E stained tissue sample and performing "vanilla" convolution on the image to produce a set of initial feature maps. The machine learning model that includes processing the set of initial feature maps with a CNN that implements octave convolution. This can include processing the image with a first layer of octave convolution to generate a set of high-frequency feature maps and a set of low-frequency feature maps. The low-frequency feature maps have a lower spatial resolution than the high-frequency to maps such that subsequent convolution operations to determine low-frequency features require a fewer number of convolution operations thus reducing processing time, which may result in higher efficiency of the computer resources used for such processing. In one example, the low-frequency feature maps have a spatial resolution that is one half the spatial resolution of the high-frequency feature maps. Although various ratios spatial resolution may be used, using a spatial resolution of ½ (or ¼, etc.) can allow for easier of sampling and pooling calculations allowing the processing of high-frequency feature maps and low-frequency feature maps to communicate (and share information) more easily.

After the high-frequency and low-frequency feature maps are generated they are further processed by additional one or more layers of the convolutional neural network that are configured for octave convolution, and a refined set of high-frequency feature maps and refined low-frequency feature maps are generated. Finally, the last layer of the convolutional neural network that implements octave convolution, the refined set of high-frequency feature maps and refined set of low-frequency feature maps are processed and combined via of pooling and sampling to generate a final "combined" set of feature maps. The combined set of feature maps may be stored for processing at a later time, or send to the feature classifier where features in the feature maps are classified. In some embodiments, the features are classified using a semantic segmentation process.

System Overview

Figure 1:
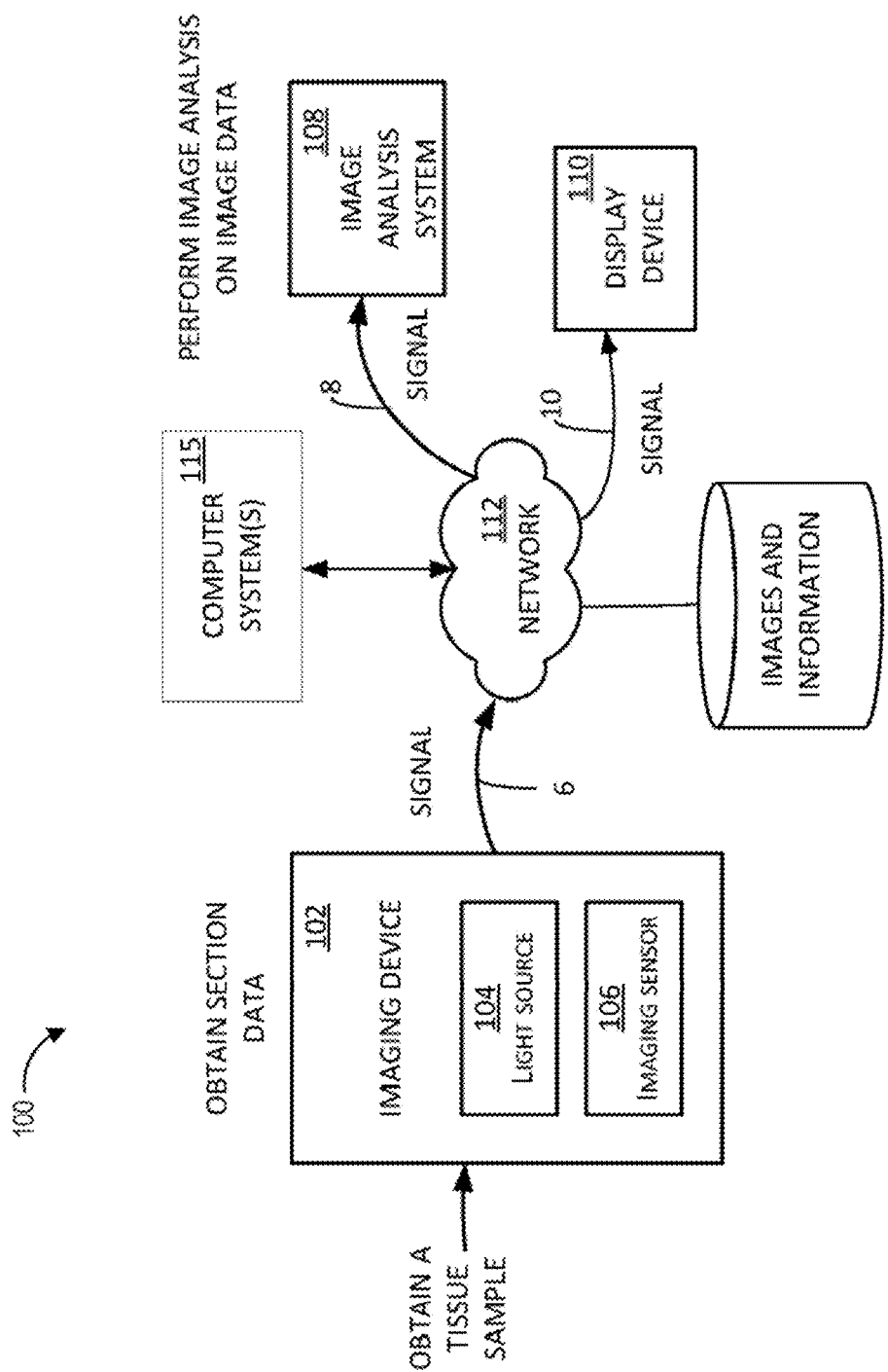
FIG. 1 illustrates an example environment of an imaging system which includes an image analysis system that can be used to implement the systems and methods described herein.

FIG. 1 illustrates an example environment 100 in which tissue sample can be stained, imaged, and analyzed. The environment 100 may include an automated slide stainer that is controlled to produce consistently stained slides of tissue samples based on one or more protocols. The environment 100 can also include an imaging device 102 that generates a digital representation of a stained slide. In an example, the tissue sample is stained using a Hematoxylin and Eosin (H&E) staining process. In many instances, H&E staining is by far preferred for viewing cellular and tissue structure detail by pathologists. The variation of stain intensity is often driven by the pathologist's learning experience and personal preference. Because this stain demonstrates such a broad range of cytoplasmic, nuclear, and extracellular matrix features, nearly all pathology related teaching texts use H&E images, and likely all pathologists are trained using H&E stained tissue samples.

In some embodiments, the environment 100 includes a multi-color (or broad spectrum) imaging device 102. The imaging device 102 can be one or more of a camera, a scanner, a medical imaging device, a microscope, etc. Further, the imaging device 102 can use imaging technologies such as X-ray radiography, magnetic resonance imaging, ultrasound, endoscopy, elastography, tactile imaging, thermography, medical photography, nuclear medicine functional imaging, positron emission tomography, single-photon emission computed tomography, etc. For example, the imaging device can be a magnetic resonance imaging ("MRI") scanner, a positron emission tomography ("PET") scanner, an ultrasound imaging device, an x-ray imaging device, a computerized tomography ("CT") scanner.

The digital representation may be referred to herein as an "image" and can be presented on a computer display device 110 for evaluation by a user. Although referred to as an image, the digital representation is a set of data which can be analyzed by computer processes, for example, for object (e.g., marker) identification, characterization, quantification, and/or spatial analysis of identified objects, etc. In some examples, an image can be used as training data for a machine learning process, and/or processed by a machine learning process to determine information from the image. The digital representation can be communicated as signal 6 to a network 112 and then communicated as a signal 8 to an image analysis system 108 for processing (e.g., feature detection, feature measurements, etc.). The image analysis system 108 may perform image analysis on received image data. The image analysis system 108 can normalize the image data obtained using color-stained images for input to a machine learning algorithm, which may determine characteristics of the image. The image analysis system may register and/or transform an image to align an image with other related images to facilitate analysis of information in the related images. Results from the image analysis system 108 can be communicated as a signal 10 to one or more display devices 110 (which also may be referred to herein as a "display device" or a "client device").

In some implementations, the imaging device 102 includes a light source 104 configured to emit light onto or through the tissue sample. In an example, the light source can be a broad-spectrum white light source emitting light across a spectrum of wavelengths. In another example, the light source can emit light across a particular range of one or more wavelengths. In some embodiments, the light source 104 is configured to provide a "brightfield" emitting light through the sample. In some embodiments, the light source 102 is configured to provide light of wavelengths that causes fluorescence of material (e.g., markers, objects) in the tissue sample. The imaging device 102 includes one or more imaging sensor 106 configured to detect light emitted from, or transmitted through, the tissue sample, based on the implementation. Embodiments of imaging using the light source 104 can involve providing light to the tissue sample within a range of frequencies.

In certain embodiments, the stained tissue sample may reflect light, or through fluorescence, emit light received from the light source 104, which can then be detected at the image sensor 106. In these implementations, the light source 104 and the image sensor 106 may be located on substantially the same side of the tissue sample. In other implementations, the light source 104 and the image sensor 106 may be located on opposite sides of the tissue sample. The image sensor 106 may be further configured to generate image data based on the broad-spectrum light detected at the image sensor 106. In certain implementations, the image sensor 106 may include a high-resolution sensor configured to generate a high-resolution image of the tissue sample. The high-resolution image may be generated based on excitation of the stained tissue sample in response to light provided onto the sample at different frequencies (e.g., a frequency spectrum) or different wavelengths. For example, fluorescence microscopy uses intense, near-monochromatic illumination. In some embodiments, light is provided by one or more xenon arc lamps or mercury-vapor lamps with an excitation filter, a laser, a supercontinuum source, and/or a high-power LED.

The imaging device 102 may capture and/or generate image data for analysis. The imaging device 102 may include one or more lenses, image sensors, processors, or memory components. The imaging device 102 may receive a user interaction. The user interaction may be a request to capture image data. Based on the user interaction, the imaging device 102 may capture image data. In some embodiments, the imaging device 102 may capture image data periodically (e.g., every 10, 20, or 30 minutes). In other embodiments, the imaging device 102 may determine that an item has been placed in view of the imaging device 102 (e.g., a histological sample has been placed on a table and/or platform associated with the imaging device 102) and, based on this determination, capture image data corresponding to the item. The imaging device 102 may further receive image data from additional imaging devices. For example, the imaging device 102 may be a node that routes image data from other imaging devices to the image analysis system 108. In some embodiments, the imaging device 102 may be located within the image analysis system 108. For example, the imaging device 102 may be a component of the image analysis system 108. Further, the image analysis system 108 may perform an imaging function. In other embodiments, the imaging device 102 and the image analysis system 108 may be connected (e.g., wirelessly or wired connection). For example, the imaging device 102 and the image analysis system 108 may communicate over a network 112. Further, the imaging device 102 and the image analysis system 108 may communicate over a wired connection. In one embodiment, the image analysis system 108 may include a docking station that enables the imaging device 102 to dock with the image analysis system 108. An electrical contact of the image analysis system 108 may connect with an electrical contact of the imaging device 102. The image analysis system 108 may be configured to determine when the imaging device 102 has been connected with the image analysis system 108 based at least in part on the electrical contacts of the image analysis system 108. In some embodiments, the image analysis system 108 may use one or more other sensors (e.g., a proximity sensor) to determine that an imaging device 102 has been connected to the image analysis system 108. In some embodiments, the image analysis system 108 may be connected to (via a wired or a wireless connection) a plurality of imaging devices.

The image analysis system 108 may include various components for providing the features described herein. In some embodiments, the image analysis system 108 may include one or more image analysis modules to perform the image analysis of the image data received from the imaging device 102. The image analysis modules may perform one or more imaging algorithms using the image data.

The image analysis system 108 may be connected to one or more display device 110. The image analysis system 108 may be connected (via a wireless or wired connection) to the display device 110 to provide a recommendation for a set of image data. The image analysis system 108 may transmit the recommendation to the display device 110 via the network 112. In some embodiments, the image analysis system 108 and the user computing device 110 may be configured for connection such that the user computing device 110 can engage and disengage with image analysis system 108 in order to receive the recommendation. For example, the display device 110 may engage with the image analysis system 108 upon determining that the image analysis system 108 has generated a recommendation for the display device 110. Further, a particular display device 110 may connect to the image analysis system 108 based on the image analysis system 108 performing image analysis on image data that corresponds to the particular user computing device 110. For example, a user may be associated with a plurality of histological samples. Upon determining, that a particular histological sample is associated with a particular user and a corresponding display device 110, the image analysis system 108 can transmit a recommendation for the histological sample to the display device 110. In some embodiments, the display device 110 may dock with the image analysis system 108 in order to receive the recommendation.

In some implementations, the imaging device 102, the image analysis system 108, and/or the display device 110 may be in wireless communication. For example, the imaging device 102, the image analysis system 108, and/or the display device 110 may communicate over a network 112. The network 112 may include any viable communication technology, such as wired and/or wireless modalities and/or technologies. The network may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. The network 112 may include, and/or may or may not have access to and/or from, the internet. The imaging device 102 and the image analysis system 108 may communicate image data. For example, the imaging device 102 may communicate image data associated with a histological sample to the image analysis system 108 via the network 112 for analysis. The image analysis system 108 and the display device 110 may communicate a recommendation corresponding to the image data. For example, the image analysis system 108 may communicate a diagnosis regarding whether the image data is indicative of a disease present in the tissue sample. In some embodiments, the imaging device 102 and the image analysis system 108 may communicate via a first network and the image analysis system 108 and the display device 110 may communicate via a second network. In other embodiments, the imaging device 102, the image analysis system 108, and the display device 110 may communicate over the same network.

One or more third-party computer systems 115 ("computer system 115") may communicate with the imaging device 102, the image analysis system 108, and/or the display device 110. In some embodiments, the computer system 115 may communicate directly with the imaging device 102, the image analysis system 108, and/or the display device 110 directly or via the network 112.

The computer system 115 can provide information to change functionality on the imaging device 102, the image analysis system 108, and/or the display device 110, or even the network 112. For example, the information may be new software, a software update, new or revised lookup tables, or data or any other type of information that is used in any way to generate, manipulate, transfer or render an image (all being referred to herein as an "update" for ease of reference). The update may be related to, for example, image compression, image transfer, image storage, image display, image rendering, etc. The computer system 115 may provide a message to the device or system to be updated or may provide a message to a user who interacts with the system control updating the system. In some embodiments, the computer system 115 provides an update automatically, e.g., periodically or as needed/available. In some embodiments, the computer system 105 may provide an update in response to receiving an indication from a user provide the update (e.g., affirmation for the update or a request for the update).

With reference to an illustrative embodiment, the imaging device 102 can obtain a tissue sample (or "tissue block"). In an example, the tissue sample may biological tissue that has been removed from a person or an animal for analysis. The tissue sample may be a histological sample. The tissue sample may be sectioned (sliced) to generate one or more sections of the tissue sample. The imaging device 102 can image (e.g., scan, capture, record, etc.) the one or more sections of the tissue sample. As will be discussed in further below, in order to prepare portions (e.g., slices or "sections") of the tissue sample for analysis, various histological techniques may be performed. The imaging device 102 can capture an image of a stained section from the tissue sample and store corresponding block and serial tissue section data in the imaging device 102. The imaging device 102 may obtain the data based on a user interaction. For example, a user may provide an input through a user interface (e.g., a graphical user interface ("GUP")) and request that the imaging device 102 image the tissue sample. Further, the user can interact with imaging device 102 to cause the imaging device 102 to image sections from the tissue sample. For example, the user can toggle a switch of the imaging device 102, push a button of the imaging device 102, provide a voice command to the imaging device 102, or otherwise interact with the imaging device 102 to cause the imaging device 102 to image the sections from the tissue sample. In some embodiments, the imaging device 102 may image sections from the tissue sample based on detecting, by the imaging device 102, that a glass slide holding a stained tissue section has been placed in a viewport of the imaging device 102. For example, the imaging device 102 may determine that a glass slide holding a stained tissue section has been placed on a viewport of the imaging device 102 and, based on this determination, image the tissue section.

The imaging device 102 can obtain images of sections of the tissue sample data. Various histological techniques may be performed on the section. The imaging device 102 can capture an image of each section, and store the images for subsequent analysis. The imaging device 102 may obtain the section images based on a user interaction. For example, a user may provide an input through a user interface and request that the imaging device 102 image the section. Further, the user can interact with imaging device 102 to cause the imaging device 102 to image the section.

The imaging device 102 can transmit a signal 6 to the image analysis system 108 representing the captured image data (e.g., the block data and the slice data). The imaging device 102 can send the captured image data as an electronic signal 6 to the network 112, which provides the image data as a signal 8 to the image analysis system 108. The signal may include and/or correspond to a pixel representation of the section data. It will be understood that the signal can include and/or correspond to more, less, or different image data. For example, the signal may correspond to multiple sections, and may represent a first section data and a second section data. Further, the signal may enable the image analysis system 108 to reconstruct the tissue sample using the section data.

The image analysis system 108 can perform image analysis on the block data and the slice data provided by the imaging device 102. In order to perform the image analysis, the image analysis system 108 may utilize one or more image analysis modules that can perform one or more image processing functions. Each image analysis model can include computer executable instructions which are run by one or more computer hardware processors to perform certain functionality. In an example, an image analysis module may include an imaging algorithm, a machine learning model, a convolutional neural network, or any other modules for performing the image processing functions. In another example, an image analysis module can include one or more spatial analysis algorithms to measure the proximity between markers within an image of a section, or across images of sections of the tissue sample. In some examples, based on performing the image processing functions, the image analysis module can determine a likelihood that the block data and the slice data correspond to the same tissue block. For example, an image processing functions may include an edge analysis of the block data and the slice data and based on the edge analysis, determine whether the block data and the slice data correspond to the same tissue block. The image analysis system 108 can obtain a confidence threshold from the display device 110, the imaging device 102, or any other device. In some embodiments, the image analysis system 108 can determine the confidence threshold based on a response by the display device 110 to a particular recommendation. Further, the confidence threshold may be specific to a user, a group of users, a type of tissue block, a location of the tissue block, or any other factor. The image analysis system 108 can compare the determined confidence threshold with the image analysis performed by the image analysis module. Based on this comparison, the image analysis system 108 can generate a recommendation indicating a recommended action for the display device 110 based on the likelihood that the block data and the slice data correspond to the same tissue block. In other embodiments, the image analysis system 108 can provide a diagnosis regarding whether the image data is indicative of a disease present in the tissue sample, for example, based on the results of a machine learning algorithm.

The image analysis system 108 can provide information to the display device 110. In an example, the image analysis system 108 can send the information as a signal 6 to the network 112 which provides the information as a signal 8 to the display device 110. The signal may include results of the image analysis, for example, feature information or semantic segmentation information. The display device 110 can assist the pathologist in determining the diagnosis. In some embodiments, the image analysis system 108 may transmit a series of recommendations corresponding to a group of tissues blocks and/or a group of slices. The image analysis system 108 can include, in the recommendation, a recommended action of a user. For example, the recommendation may include a recommendation for the user to review the tissue block and the slice(s). Further, the recommendation may include a recommendation that the user does not need to review the tissue block and the slice(s).

Imaging Prepared Blocks and Prepared Slices

Figure 2:
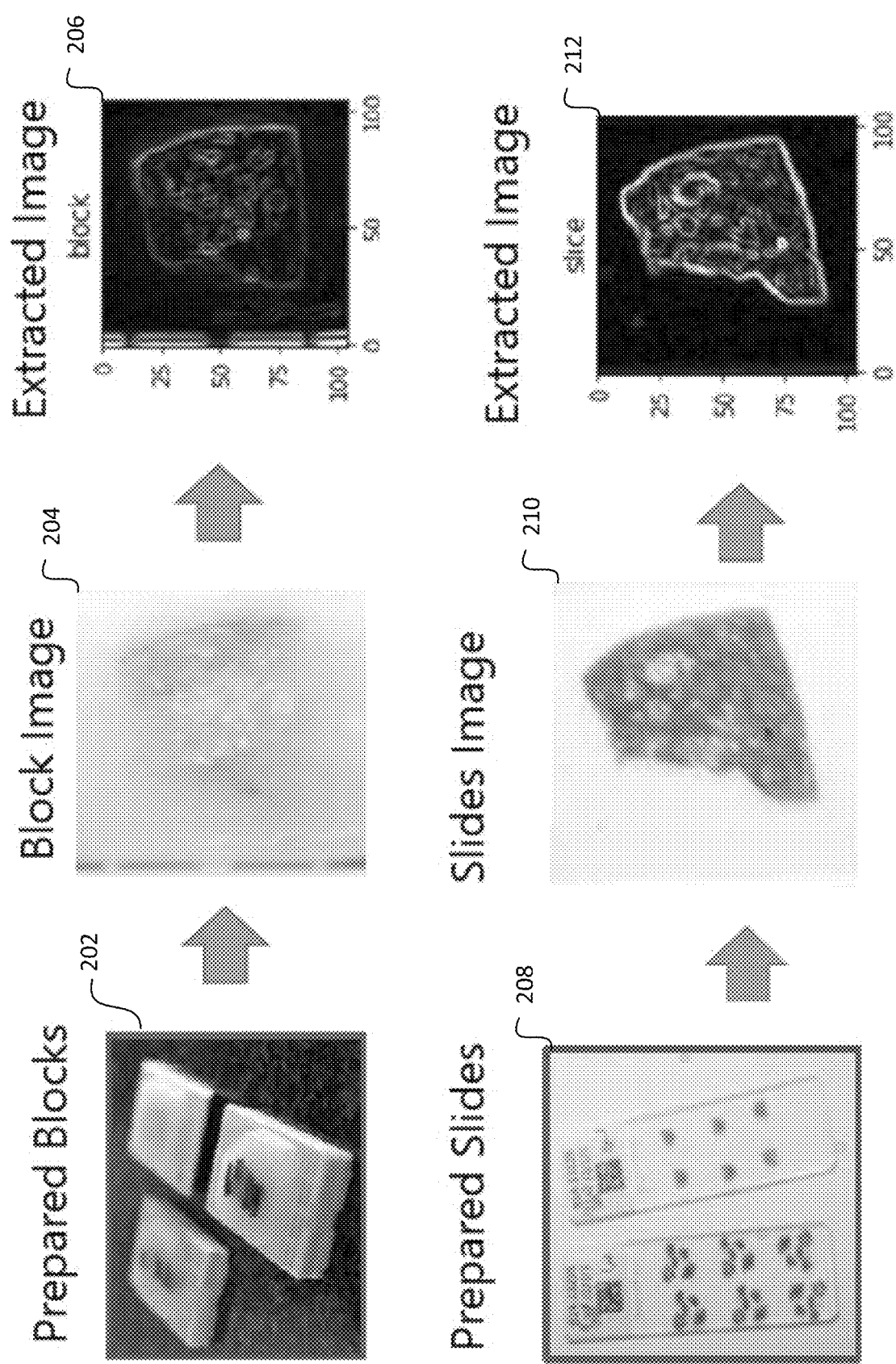
FIG. 2 depicts an example workflow for generating image data from a tissue sample block according to some embodiments.

FIG. 2 depicts an example workflow 200 for generating image data from a tissue sample block according to some embodiments. The example workflow 200 illustrates a process for generating prepared blocks and prepared slices from a tissue block and generating pre-processed images based on the prepared blocks and the prepared slices. The example workflow 200 may be implemented by one or more computing devices. For example, the example workflow 200 may be implemented by a microtome, a stainer, a coverslipper, and an imaging device. Each computing device may perform a portion of the example workflow. For example, the microtome may cut the tissue block in order to generate one or more slices of the tissue block. The slices are transferred (e.g., manually) to the slides. The stainer may stain the slides. The coverslipper places a cover slip over each of the stained samples. After coverslipping, the imaging device can image each slide.

A tissue block can be obtained from a patient (e.g., a human, an animal, etc.). The tissue block may correspond to a section of tissue from the patient. The tissue block may be surgically removed from the patient for further analysis. For example, the tissue block may be removed in order to determine if the tissue block has certain characteristics (e.g., if the tissue block is cancerous). In order to generate the prepared blocks 202, the tissue block may be prepared using a particular preparation process by a tissue processor. In the tissue processor the tissue will be dehydrated with multiple steps of alcohol and then infiltrated with molten paraffin wax to stabilize the tissue. For example, the tissue (sample) may be embedded in a paraffin wax block. The result will be a prepared block 202 FIG. 2. This block is ready for cutting with a microtome. The tissue block may also be embedded using an optimal cutting temperature ("OCT") compound. The preparation process may include one or more of a paraffin embedding, an OCT-embedding, or any other embedding of the tissue block. In the example of FIG. 2, the tissue block is embedded using paraffin embedding. Further, the tissue block is embedded within a paraffin wax block and mounted on a microscopic slide in order to formulate the prepared block.

Figure 6:
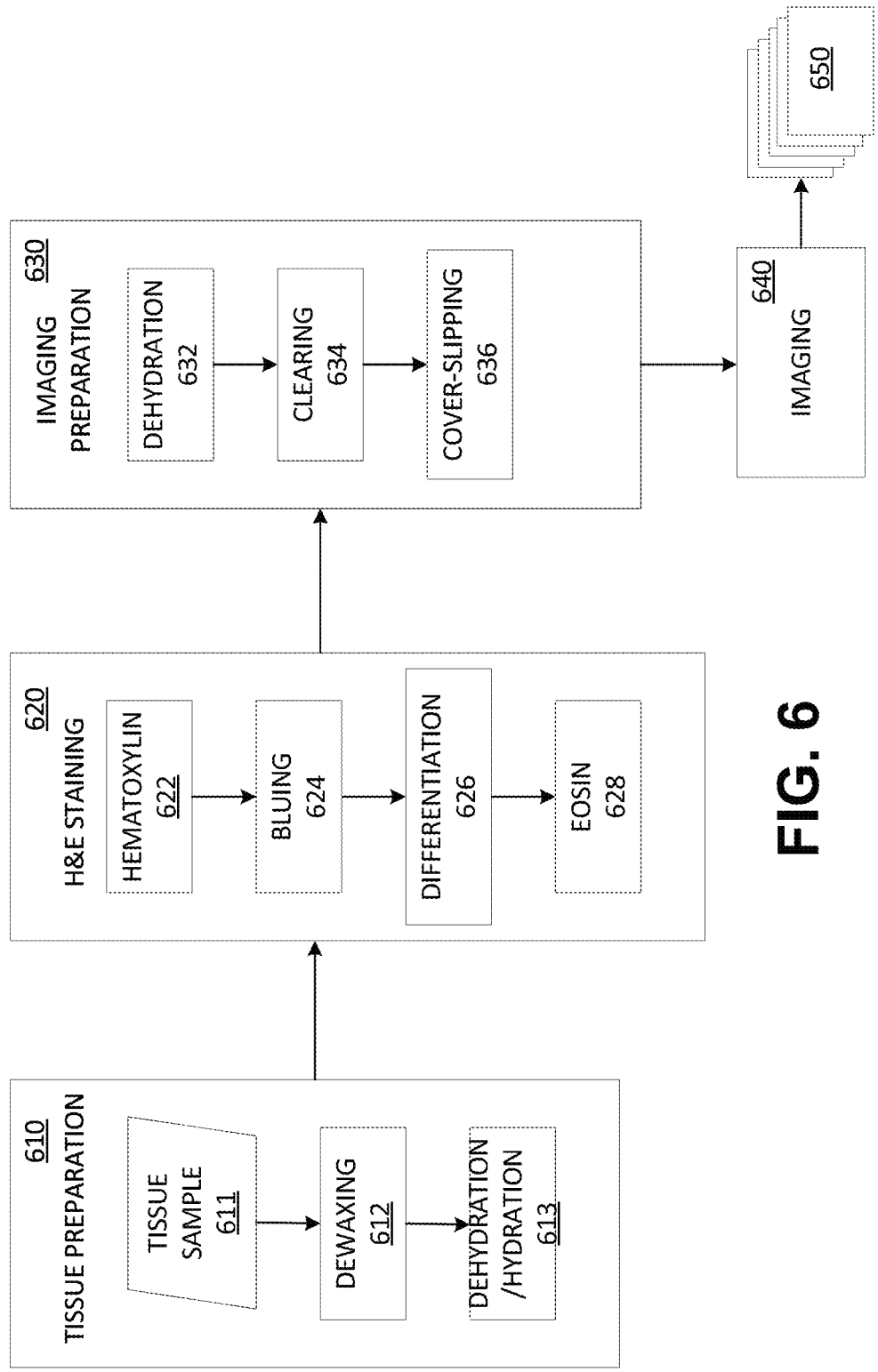
FIG. 6 illustrates an example of a process for producing an H&E stained tissue sample and generating an image of the tissue sample.

The microtome can obtain a slice of the tissue block in order to generate the prepared slices 204. The microtome can use one or more blades to slice the tissue block and generate a slice (e.g., a section) of the tissue block. The microtome can further slice the tissue block to generate a slice with a preferred level of thickness. For example, the slice of the tissue block may be between 1 μm (0.001 millimeter) and 60 μm (0.06 millimeters). The microtome can provide the slice of the tissue block to a coverslipper. In generating the prepared slices 204, a stainer may also stain the slice of the tissue block using any staining protocol. In many preferred embodiments, the tissue sample is stained with a Hematoxylin and Eosin (H&E) staining process. In example of an H&E staining process is illustrated in FIG. 6. Further, the stainer may stain the slice of the tissue block in order to highlight certain portions of the prepared slices 204 (e.g., an area of interest). In some embodiments, a computing device may include both the coverslipper and the stainer and the slide may be stained as part of the process of generating the slide. After staining, a coverslipper can encase the slice of the tissue block between a coverslip and the slide to generate the prepared slices 204. The prepared slices 204 may include the slice mounted in a certain position.

The prepared blocks 202 and the prepared slices 204 may be provided to an imaging device for imaging. In some embodiments, the prepared blocks 202 and the prepared slices 204 may be provided to the same imaging device. In other embodiments, the prepared blocks 202 and the prepared slices 204 are provided to different imaging devices. The imaging device can perform one or more imaging operations on the prepared blocks 202 and the prepared slices 204. In some embodiments, a computing device may include one or more of the tissue preparer, the microtome, the coverslipper, the stainer, and/or the imaging device.

The imaging device can capture an image of the prepared block 202 in order to generate the block image 206. The block image 206 may be a representation of the prepared block 202. For example, the block image 206 may be a representation of the prepared block 202 from one direction (e.g., from above). The representation of the prepared block 202 may correspond to the same direction as the prepared slices 204 and/or the slice of the tissue block. For example, if the tissue block is sliced in a cross-sectional manner in order to generate the slice of the tissue block, the block image 206 may correspond to the same cross-sectional view. In order to generate the block image 206, the prepared block 202 may be placed in a cradle of the imaging device and imaged by the imaging device. Further, the block image 206 may include certain characteristics. For example, the block image 206 may be a color image with a particular resolution level, clarity level, zoom level, or any other image characteristics.

The imaging device can capture an image of the prepared slices 204 in order to generate the slice image 208. The imaging device can capture an image of a particular slice of the prepared slices 204. For example, a slide may include any number of prepared slices and the imaging device may capture an image of a particular slice of the prepared slices. The slice image 208 may be a representation of the prepared slices 204. The slice image 208 may correspond to a view of the slice according to how the slice of the tissue block was generated. For example, if the slice of the tissue block was generated via a cross-sectional cut of the tissue block, the slice image 208 may correspond to the same cross-sectional view. In order to generate the slice image 208, the slide containing the prepared slices 204 may be placed in a cradle of the imaging device (e.g., in a viewer of a microscope) and imaged by the imaging device. Further, the slice image 208 may include certain characteristics. For example, the slice image 208 may be a color image with a particular resolution level, clarity level, zoom level, or any other image characteristics.

The imaging device can process the block image 206 in order to generate a pre-processed image 210 and the slice image 208 in order to generate the pre-processed image 212. The imaging device can perform one or more image operations on the block image 206 and the slice image 208 in order to generate the pre-processed image 210 and the pre-processed image 212. The one or more image operations may include isolating (e.g., focusing on) various features of the pre-processed image 210 and the pre-processed imaged 212. For example, the one or more image operations may include isolating the edges of a slice or a tissue block, isolating areas of interest within a slice or a tissue block, or otherwise modifying (e.g., transforming) the block image 206 and/or the slice image 208. In some embodiments, the imaging device can perform the one or more image operations on one of the block image 206 or the slice image 208. For example, the imaging may perform the one or more image operations on the block image 206. In other embodiments, the imaging device can perform first image operations on the block image 206 and second image operations on the slice image 208. The imaging device may provide the pre-processed image 210 and the pre-processed image 212 to the image analysis system to determine a likelihood that the preprocessed image 210 and the pre-processed image 212 correspond to the same tissue block.

Slicing a Tissue Block

Figure 3A:
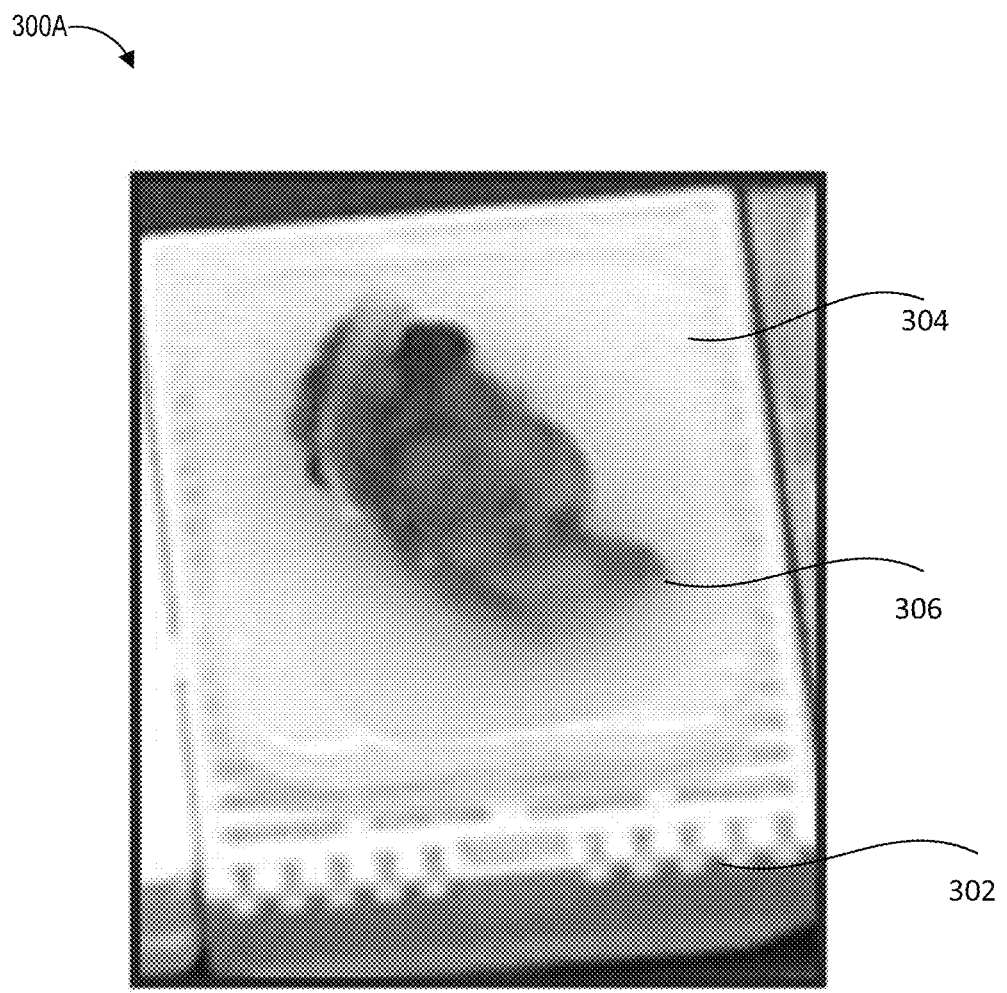
FIG. 3A illustrates an example prepared tissue block according to some embodiments.

FIG. 3A illustrates an example prepared tissue block 300A according to some embodiments. The prepared tissue block 300A may include a tissue block 306 that is preserved (e.g., chemically preserved, fixed, supported) in a particular manner. In order to generate the prepared tissue block 300A, the tissue block 306 can be placed in a fixing agent (e.g., a liquid fixing agent). For example, the tissue block 306 can be placed in a fixative such as formaldehyde solution. The fixing agent can penetrate the tissue block 306 and preserve the tissue block 306. The tissue block 306 can subsequently be isolated in order to enable further preservation of the tissue block 306. Further, the tissue block 306 can be immersed in one or more solutions (e.g., ethanol solutions) in order to replace water within the tissue block 306 with the one or more solutions. The tissue block 306 can be immersed in one or more intermediate solutions. Further, the tissue block 306 can be immersed in a final solution (e.g., a histological wax). For example, the histological wax may be a purified paraffin wax. After being immersed in a final solution, the tissue block 306 may be formed into a prepared tissue block 300A. For example, the tissue block 306 may be placed into a mold filled with the histological wax. By placing the tissue block in the mold, the tissue block 306 may be molded (e.g., encased) in the final solution 304. In order to generate the prepared tissue block 300A, the tissue block 306 in the final solution 304 may be placed on a platform 302. Therefore, the prepared tissue block 300A may be generated. It will be understood that the prepared tissue block 300A may be prepared according to any tissue preparation methods.

Figure 3B:
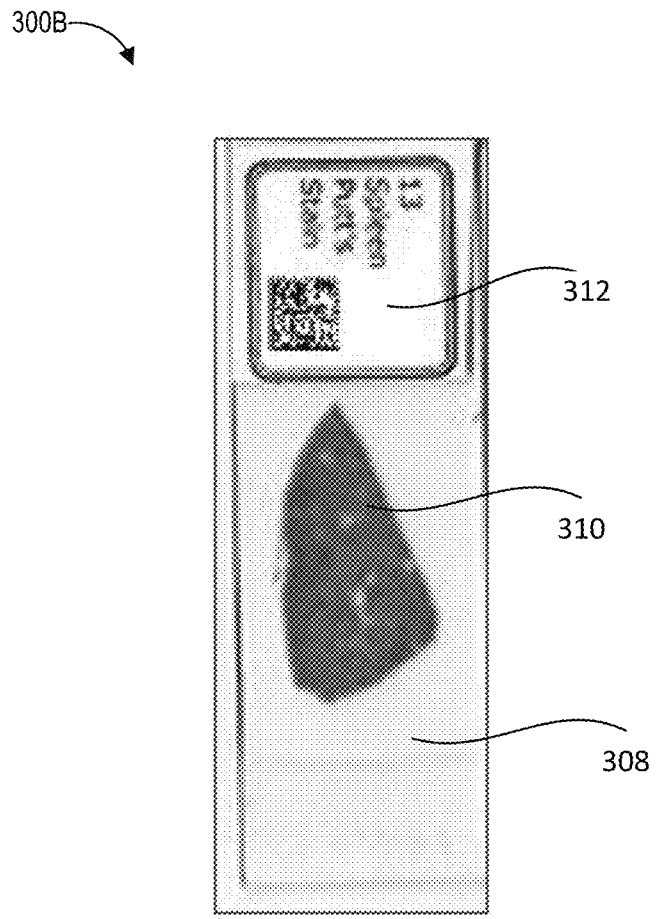
FIG. 3B illustrates an example prepared tissue block and an example prepared tissue slice 300B according to some embodiments.

FIG. 3B illustrates an example prepared tissue block 300A and an example prepared tissue slice 300B according to some embodiments. In order to generate the prepared tissue slice 300B, the prepared tissue block 300A may be sliced by a microtome. The microtome may include one or more blades to slice the prepared tissue block 300A. The microtome may take a cross-sectional slice 310 of the prepared tissue block 300A using the one or more blades. The cross-sectional slice 310 of the prepared tissue block 300A may include a slice 310 (e.g., a section) of the tissue block 306 encased in a slice of the final solution 304. In order to preserve the slice 310 of the tissue block 306, the slice 310 of the tissue block 306 may be modified (e.g., washed) to remove the final solution 304 from the slice 310 of the tissue block 306. For example, the final solution 304 may be rinsed and/or isolated from the slice 310 of the tissue block 306. Further, the slice 310 of the tissue block 306 may be stained by a stainer. In some embodiments, the slice 310 of the tissue block 306 may not be stained. The slice 310 of the tissue block 306 may subsequently be encased in a slide 308 by a coverslipper to generate the prepared tissue slice 300B. The prepared tissue slice 300B may include an identifier 312 identifying the tissue block 306 that corresponds to the prepared tissue slice 300B. The prepared tissue block 300A may also include an identifier that identifies the tissue block 306 that corresponds to the prepared tissue block 300A. As the prepared tissue block 300A and the prepared tissue slice 300B correspond to the same tissue block 306, the identifier of the prepared tissue block 300A and the identifier 312 of the prepared tissue slice 300B may identify the same tissue block 306.

Imaging Devices

Figure 4:
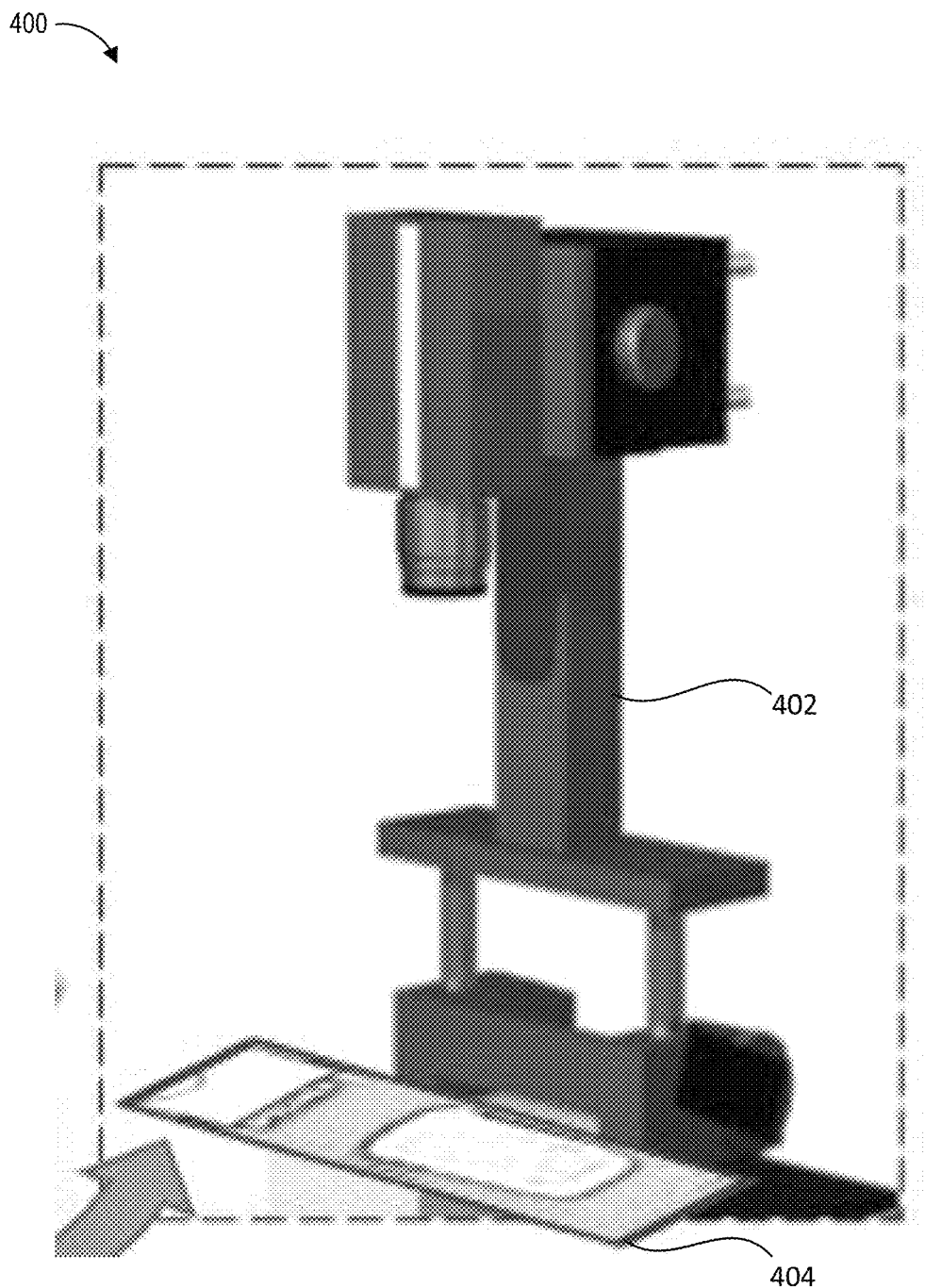
FIG. 4 shows an example imaging device, according to one embodiment.

FIG. 4 shows an example imaging device 400, according to one embodiment. The imaging device 400 can include an imaging apparatus 402 (e.g., a lens and an image sensor) and a platform 404. The imaging device 400 can receive a prepared tissue block and/or a prepared tissue slice via the platform 404. Further, the imaging device can use the imaging apparatus 402 to capture image data corresponding to the prepared block and/or the prepared slice. The imaging device 400 can be one or more of a camera, a scanner, a medical imaging device, a microscope, etc. Further, the imaging device 400 can use imaging technologies such as X-ray radiography, magnetic resonance imaging, ultrasound, endoscopy, elastography, tactile imaging, thermography, medical photography, nuclear medicine functional imaging, positron emission tomography, single-photon emission computed tomography, etc. For example, the imaging device can be a magnetic resonance imaging ("MIll") scanner, a positron emission tomography ("PET") scanner, an ultrasound imaging device, an x-ray imaging device, a computerized tomography ("CT") scanner.

The imaging device 400 may receive one or more of the prepared tissue block and/or the prepared tissue slice and capture corresponding image data. In some embodiments, the imaging device 400 may capture image data corresponding to a plurality of prepared tissue slices and/or a plurality of prepared tissue blocks. The imaging device 400 may further capture, through the lens of the imaging apparatus 402, using the image sensor of the imaging apparatus 402, a representation of a prepared tissue slice and/or a prepared tissue block as placed on the platform. Therefore, the imaging device 400 can capture image data in order for the image analysis system to compare the image data to determine if the image data corresponds to the same tissue block.

Figure 5:
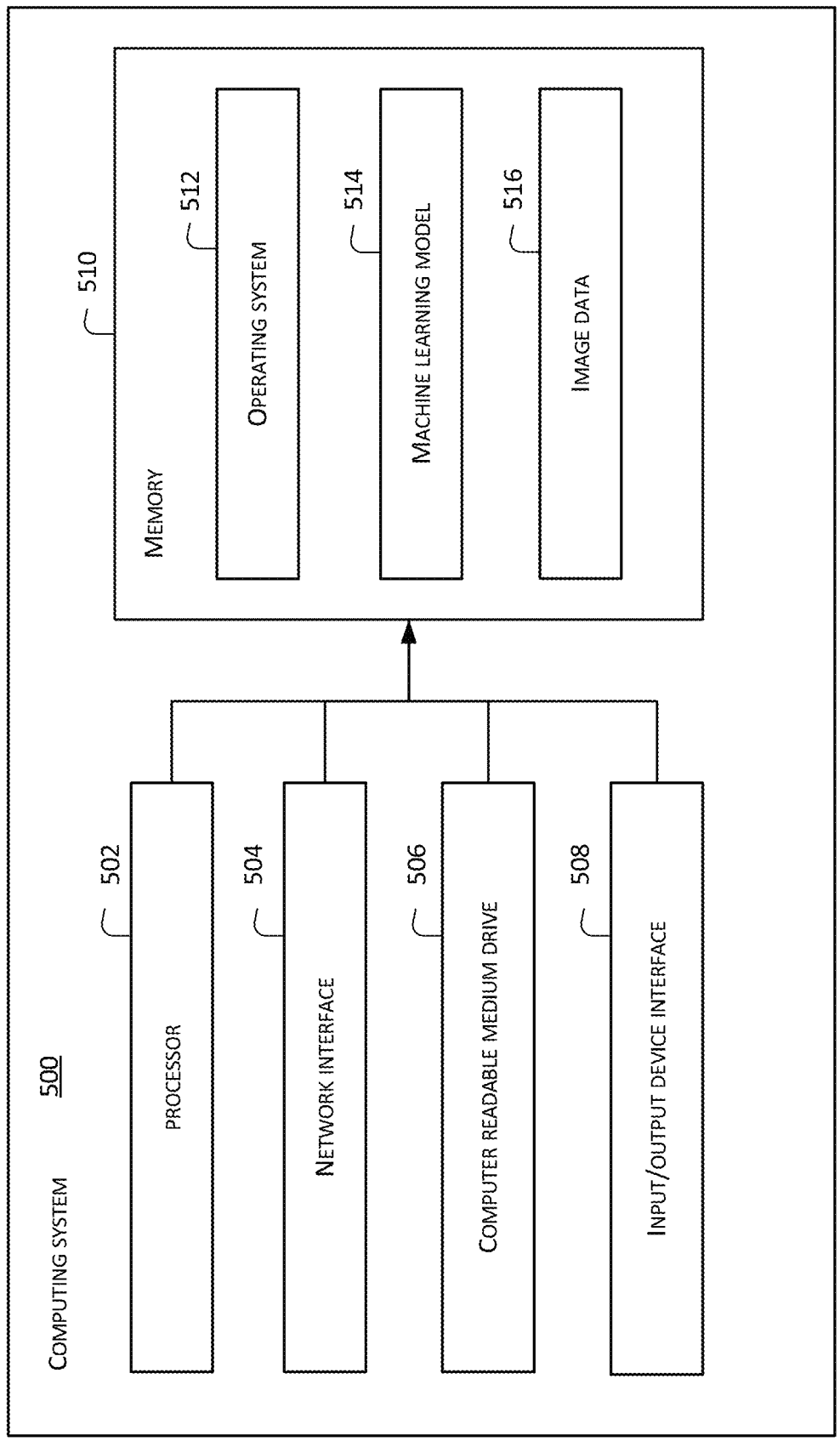
FIG. 5 is an example computing system which can implement any one or more of the imaging device, image analysis system, and user computing device of the multi-spectral imaging system illustrated in FIG. 1.

FIG. 5 is an example computing system 500 which, in various embodiments, can implement the functionality of the imaging device 102, image analysis system 108, and/or the display device 110 of the system illustrated in FIG. 1. Referring to FIG. 5, the computing system 500 may include one or more hardware processors 502, such as physical central processing units ("CPUs"), one or more network interfaces 504, such as a network interface cards ("NICs"), and one or more computer readable medium 506. The computer readable medium can be, for example, a high-density disk ("HDDs"), solid state drives ("SDDs"), flash drives, and/or other persistent non-transitory computer-readable media. The computing system 500 may also include an input/output device interface 508, such as an input/output ("IO") interface in communication with one or more microphones, and one or more non-transitory computer readable memory (or "medium") 510, such as random-access memory ("RAM") and/or other volatile non-transitory computer-readable media.

The network interface 504 can provide connectivity to one or more networks or computing systems. The hardware processor 502 can receive information and instructions from other computing systems or services via the network interface 504. The network interface 504 can also store data directly to the computer-readable memory 510. The hardware processor 502 can communicate to and from the computer-readable memory 510, execute instructions and process data in the computer readable memory 510, etc.

The computer readable memory 510 may include computer program instructions that the hardware processor 502 executes in order to implement one or more embodiments. The computer readable memory 510 can store an operating system 512 that provides computer program instructions for use by the computer processor 502 in the general administration and operation of the computing system 500. The computer readable memory 510 can further include program instructions and other information for implementing aspects of the present disclosure. For example, the computer readable medium 510 can have having program instructions for causing a hardware processor to perform a method of applying a machine learning model 514 to image data 516 comprising an H&E stained tissue sample image, the machine learning model 514 including at least a feature extractor network. The machine learning model 514 can include at least performing convolution operations on the H&E stained tissue sample image to generate a plurality of initial feature maps, applying octave-convolution-first-layer operations on the initial feature maps to generate initial high-frequency feature maps and low-frequency feature maps, applying octave-convolution operations on the high-frequency initial feature maps to generate refined high-frequency feature maps, applying octave-convolution operations on the low-frequency initial feature maps to generate refined low-frequency feature maps, and applying octave-convolution last layer operations on the refined high-frequency feature maps and the refined low-frequency feature maps to produce combined feature maps. In another example, the computer readable medium 510 includes instructions to execute one or more of the processes disclosed herein, for example, the process illustrated in FIG. 9. In some embodiments, multiple computing systems 500 may communicate with each other via respective network interfaces 504, may implement multiple sessions each session with a corresponding connection parameter (e.g., each computing system 500 may execute one or more separate instances of processes described herein).

FIG. 6 illustrates an example of a process for producing an H&E stained tissue sample and generating an image of the tissue sample. For routine diagnosis, the use of hematoxylin and eosin stains are preferred for viewing cellular and tissue structure detail by pathologists. The hematoxylin and eosin stains provide a comprehensive picture of the microanatomy of organs and tissues. Hematoxylin precisely stains nuclear components, including heterochromatin and nucleoli, while eosin stains cytoplasmic components including collagen and elastic fibers, muscle fibers and red blood cells. In a high-quality H&E stain, there are subtle differences in the shades of color produced by the stains, particularly eosin, and this aids in the detection and interpretation of morphological changes associated with disease. The variation of stain intensity is often driven by the pathologist's learning experience and personal preference. Because this stain demonstrates such a broad range of cytoplasmic, nuclear, and extracellular matrix features, nearly all teaching texts use H&E images. As illustrated in FIG. 6, staining procedure for H&E follows a basic protocol of tissue preparation 610, H&E Staining 620, and imaging preparation 630, which are described in further detail below.

Hematoxylin and eosin stains are used in many areas of the histology laboratory. Hematoxylin is used to illustrate nuclear detail in cells. Depth of coloration is not only related to the amount of DNA in the nuclei but also to the length of time the sample spends in hematoxylin. The dye itself is extracted from the tree Haematoxylum campechianum. Oxidation of the hematoxylin produces hematein, which is the actual dye used in an H&E stain. Addition of the mordant improves the ability of the hematein to attach to the anionic (negatively charged) components of the tissues. Hematoxylins are typically classified by the mordant used before staining. Mordants strengthen the positive ionic charge of the hematin. This aids the bonding of the hematin to the anionic tissue component, which is most commonly chromatin. The type of mordant also influences the final color of the stained components. The most common mordant used in routine histology is aluminum ammonium sulfate (alum). This mordant causes the nuclei to be red in color, which is then changed to the more familiar blue color when the sample is later rinsed with a weakly basic solution.

Mayer's hematoxylin is an alum hematoxylin, a commonly used stain that may be employed for both progressive and regressive stains. It is often used as a nuclear counterstain for special stains and immunohistochemistry. For these applications, Mayer's is used to stain the nuclei and then blued without the use of a differentiator. Mayer's is a water-based stain. Harris' hematoxylin is another commonly used alum hematoxylin that may be used for progressive staining of cytology specimens but can also be used for either progressive or regressive staining in histology. The staining tends to provide clear nuclear detail. One challenge when using Harris' hematoxylin is that it is best differentiated with a mild acid, as opposed to the more commonly used hydrochloric acid-based differentiators. Harris' hematoxylin is an alcohol-based stain. Gill's hematoxylin is an alum hematoxylin. It may be used as a progressive or regressive stain and is available in different concentrations. Because it is made with water and ethylene glycol, autoxidation of the stain is typically prevented over months, making it more stable than Harris' hematoxylin. However, the nature of Gill's hematoxylin is such that extra-nuclear staining may occur. Mucin and even adhesives used on the slide may become heavily contaminated with Gill's stain.

The hematoxylins that use iron salts as a mordant are typically used in special stains. This is because they can demonstrate more tissue structures than alum hematoxylins, such as myelin and elastin fibers. One of the best known is Weigert's which is used in the Verhoeff-Van Gieson stain.

Eosin is the most commonly used counterstain that distinguishes between the cytoplasm and nuclei of cells. It is typically pink, with different shades of pink for different types of connective tissue fibers. Eosin Y is the most commonly used form of eosin and may be used in both water and alcohol. The addition of a small amount of acetic acid will also sharpen the staining of the eosin. Eosin with phloxine added will enhance the reds seen with H&E staining. So for those who want to see richer looking reds, phloxine may be added. Other eosin mixtures are sometimes used, such as EA50 and EA65. These stains are primarily used for cytology, and in addition to eosin Y, include light green, yellowish, and Bismarck brown. The addition of these two dyes provides for the variations in color from pale blue to pink cytoplasm, best noted in the squamous cells of a pap smear. The concentration of the mixture determines the designation of 50 or 65. The differentiation of stains allows for the ability to selectively remove stain from tissues to the taste of the viewer. In the case of hematoxylin, hydrochloric acid (for rapid differentiation) and acetic acid (for slower, more controlled differentiation) are most commonly used. While hydrochloric acid (HCl) has historically been the standard, milder acids are being used to provide gentler dye removal. Part of this trend is due to the use of automated staining, which must accommodate the movement of the robotic arm in addition to the time spent in the reagent.

Bluing reagents, such as Scott's Tap Water, may be used to change the hematoxylin from red to the traditional blue color we expect. These slightly basic solutions chemically alter the dye to produce this color change. In some locations, the tap water contains enough minerals so that the pH causes the water to be basic enough to allow for the bluing of nuclei without the need for a bluing specific reagent. In most cases, though, labs typically add this step to ensure appropriate bluing. In combination, these components make up the standard stain most used in the histology laboratory.

The next steps to having a good stain is determining what type of H&E stain is desired. There are typically three types of H&E stains: progressive, modified progressive, and regressive. Progressive staining occurs when the hematoxylin is added to the tissue without being followed by a differentiator to remove excess dye. Because there is no differentiation step, background staining can occur, especially with charged or treated slides. Pathologists sometimes prefer this type of stain, because the noncellular material, such as mucin, becomes stained with the hematoxylin. This extracellular staining can be an indicator of well differentiated tumors. The following table contains a protocol with a simple regressive stain that provides a nice balance of nuclear and cytoplasmic stains. This protocol is designed with a mild acid differentiator in mind.

| | |
|---|---|
| Xylene | 2 minutes |
| Xylene | 2 minutes |
| 100% ethanol | 2 minutes |
| 100% ethanol | 2 minutes |
| 95% ethanol | 2 minutes |
| Water wash | 2 minutes |
| Hematoxylin | 3 minutes |
| Water wash | 1 minute |
| Differentiator (mild acid) | 1 minute |
| Water wash | 1 minute |

-continued

| | |
|---|---|
| Bluing | 1 minute |
| Water wash | 1 minute |
| 95% ethanol | 1 minute |
| Eosin | 45 seconds |
| 95% ethanol | 1 minute |
| 100% ethanol | 1 minute |
| 100% ethanol | 1 minute |
| Xylene | 2 minutes |
| Xylene | 2 minutes |
| Coverslip | |

Once the staining components have been selected, it is good to start with the baseline protocol. From there, edit either the hematoxylin in 30 second increments OR the eosin in 15 second increments. Remember, eosin will tend to penetrate much faster. Unless there is the need to significantly lighten or darken the eosin staining intensity, the shorter increments are best. It is also important that only one stain is changed at a time. It may appear that the hematoxylin is overstained, when the eosin just needs to be richer.

As laboratories continue to grow, the need for consistent results and continuous throughput is essential. Reproducibility is an important part of laboratory stain quality. When hand staining, human variables can make each stained slide rack look different from the last. The addition of automation not only removes the potential for inconsistency, but also frees technologists up to perform other tasks in the laboratory.

It is important that the proper balance of the dyes is achieved. Overstaining with hematoxylin can give the illusion of under-stained eosin, just as overstaining with eosin can cause the hematoxylin to appear lighter than it actually is. So, when optimizing the stain, make sure to only edit the time of one of the components. This technique will help eliminate the need to spend additional time adjusting the stain.

With regressive and modified progressive staining, a differentiator is used. If the differentiator is made in-house, there is the potential for it to be either too weak or too strong. Both scenarios will impact staining. If the differentiator is stronger than intended, it will remove more hematoxylin and will make the nuclei pale. Time is also important. Too much time in a properly prepared differentiator will also remove more hematoxylin and will ultimately understain the nuclei.

Mild acidity is critical to the shelf life of hematoxylin. Without it, the alkalinity of the tap water rinse will raise the pH such that the dye lake can precipitate, and the color will change from cherry red to purple red. Adding small amounts of acetic acid to the hematoxylin periodically will aid in maintaining appropriate pH and can extend the life of the stain.

Water is used as a differentiator for eosin. It is common to follow the eosin step with 95% ethanol. The ethanol aids with rinsing the slide, while water pulls excess eosin from the tissue. This step can help with coloration control but extending the time provides for lighter stains, while shortening the time maintains brighter coloration. However, excess water in xylene can continue the differentiation process and can be seen after coverslipping as a pink haze on the slide.

Not all tissues are created equally. Cysts and fatty samples, even when processed correctly, may be very difficult to see grossly once the slide has been stained. These samples often have open spaces where fluids or fat were in the cell, and the thinness of the cell walls may give the appearance of being light when the coloration is simply an artifact of the tissue type.

Highly cellular samples (e.g., tonsil, lymph node) can be very concerning. Remember that lymphocytes have little cytoplasm, and there is not nearly the cellular material between cells as with other tissues. For this reason, the hematoxylin does not have to compete with the eosin. The compact nature of the cells also concentrates the DNA, giving these highly cellular tissues the appearance of being overstained, when in reality, they may simply need to be sectioned thinner.

The use of clean and fresh dewaxing reagents is essential for the removal of paraffin from the slide prior to the addition of the dyes. While xylene is the most commonly used solvent, xylene substitutes are gaining in popularity because they are considered less hazardous and more ecofriendly. Water in solvents, whether from reagent contamination or a high humidity environment, reduces the ability of the solvent to remove the paraffin. Remaining paraffin prevents the dyes from penetrating the tissues, thus giving an uneven appearance.

The simplest way to prevent this from occurring is to change reagents more frequently. Adding a small amount of desiccant pellets (about a tablespoon per reagent vessel) will also reduce water contamination within solvents. These measures are especially important when using a xylene substitute, as these reagents tend to be far less tolerant of any water contamination than xylene.

As an example, the basic steps for performing an H&E stain are discussed below. During tissue preparation 610, a tissue sample 611 is received, and dewaxing 612 is performed. Following the preparation of a paraffin section, all the elements are infiltrated with and surrounded by paraffin wax which is hydrophobic and impervious to aqueous reagents. The majority of cell and tissue components have no natural color and are not visible. Thus, the first step in performing an H&E stain is to dissolve all the wax away with xylene (a hydrocarbon solvent).

As a first part of dehydration/hydration 613, after thorough de-waxing, the slide is passed through several changes of alcohol to remove the xylene, then thoroughly rinsed in water to hydrate the section that aqueous reagents will readily penetrate the cells and tissue elements.

In the H&E Staining 620, at block 622, the slide is stained with a nuclear stain such as Harris hematoxylin, which consists of a dye (oxidized hematoxylin or hematein) and a mordant or binding agent (an aluminum salt) in the solution. Initially this stains the nuclei and some other elements a reddish-purple color. At block 624, after rinsing in tap water, the section is "blued" by treatment with a weakly alkaline solution. This step converts the hematoxylin to a dark blue color. The section can now be rinsed and checked to see if the nuclei are properly stained, showing adequate contrast and to assess the level of background stain.

At block 626, the excess background stain is removed in a differentiation step. On most occasions when Harris hematoxylin is employed, a differentiation (destaining) step is required to remove non-specific background staining and to improve contrast. A weak acid alcohol is used. After this treatment, blueing and thorough rinsing is again required. Staining methods that include a destaining or differentiation step are referred to as "regressive" stains.

At block 628, the Eosin counterstain is applied. In this step, the section is now stained with an aqueous or alcoholic solution of eosin (depending on personal preference). This colors many nonnuclear elements in different shades of pink.

In image preparation 630, following the eosin stain, in the dehydration block 632 the slide is passed through several changes of alcohol to remove all traces of water. Then at block 634, the slide is rinsed in several baths of xylene which "clears" the tissue and renders it completely transparent. A thin layer of polystyrene mountant is applied, followed by a glass coverslip in block 636. If the stain and all the subsequent steps have been properly performed, the slide will reveal all the important microscopic components and be stable for many years. After a tissue sample has been stained, the tissue sample can be provided to an imaging system and at block 640 sample can be imaged to produce digital representation 650 of the stained tissue sample.

Figure 7A:
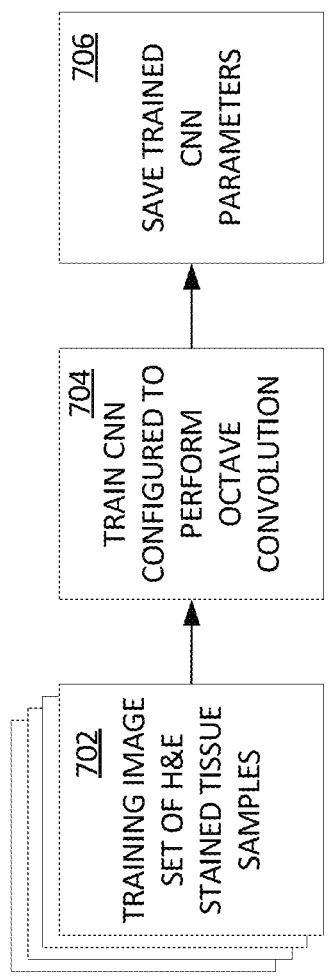
FIG. 7A illustrates an example of training a convolutional neural network (CNN), that is configured to perform octave convolution, with a training image set of H&E stained tissue samples.

FIG. 7A illustrates an example of training a machine learning model, which implements a convolutional neural network (CNN) that is configured to perform octave convolution, with a training image set of H&E stained tissue samples. In some examples, the image set is generated using the H&E staining process described in reference to FIG. 6. An image set of H&E stained tissue samples 702 is provided to a machine learning model. This image set may be a set of H&E stained tissue samples which has been annotated by a pathologist with markings indicating portions of the images which correspond to classifications that may be made based on patient images at inference time (e.g., to train a machine learning model to assist in diagnosis of breast cancer, training images may be provided which identify tumors based on classifications such as benign, carcinoma, ductal carcinoma in situ, normal, and lobular carcinoma in situ). At block 704, the machine learning model which includes a CNN configured to perform octave convolution is trained using the training image set. At block 706, parameters of the trained convolutional neural network are stored in a computer medium to be used for subsequent processing of images of H&E stained tissue samples.

Figure 7B:
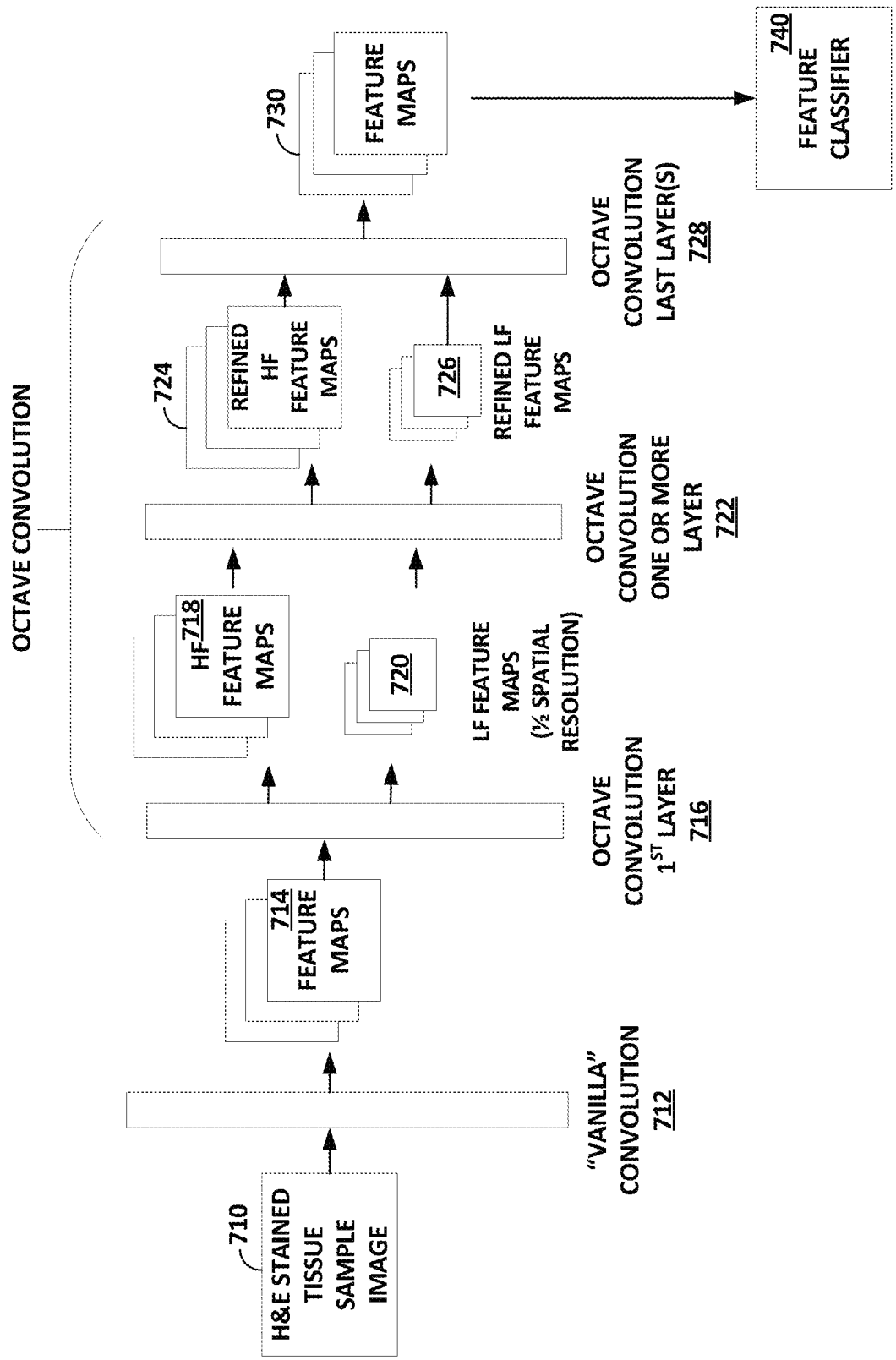
FIG. 7B illustrates a machine learning model implemented in a convolutional neural network that determines features in an image of a H&E stained tissue samples.

FIG. 7B illustrates an example of a machine learning model that implements octave convolution. That is, the machine learning model includes one or more octave convolution layers in a CNN. Certain details of octave convolution are further described with reference to FIGS. 7B, 7C, and 7D. Referring to FIG. 7B, applying a machine learning model may include receiving an image 710 of a H&E stained tissue sample, and performing in a convolution layer "vanilla" (or "typical") convolution 712 on the image 710 to produce a set of initial feature maps 714. For the vanilla convolution, all input and feature maps 710 and output feature maps 714 have the same spatial resolution. After the initial feature maps 714 are generated, they are processed by an octave convolution $1^{st}$ layer 716, which generates a set of high-frequency (HF) feature maps 718 and a set of low-frequency (LF) feature maps 720. This illustrates a feature of octave convolution that results in increased efficiency in processing H&E images. In a CNN implementing octave convolution, processing the feature maps factorizes convolutional feature maps into two groups (e.g., HF feature maps and low-frequency feature maps) at different spatial frequencies. In some examples including the one described herein, the spatial frequency of the HF feature maps is twice the spatial frequency of the LF feature maps such that the LF feature maps are a quarter the size of the HF feature maps. The high and low frequency feature maps can then be processed with different convolutions at their corresponding frequency. As the resolution for LF feature maps can be reduced, this saves both storage and computation. This also helps each layer gain a larger receptive field to capture more contextual information. Although various ratios of spatial resolution may be used, using a spatial resolution of ½ (or ¼, etc.) can allow for easier of sampling and pooling calculations in subsequent steps (for example, octave convolution last layer(s) 728) allowing the processing of HF feature maps and LF feature maps to communicate (and share information) more easily.

After the high-frequency and low-frequency feature maps are generated, they are further processed by additional one or more layers of the convolutional neural network 722 that are configured for octave convolution, and a set of refined HF feature maps 724 and a set of refined LF feature maps 726 are generated. Finally the last layer of the convolutional neural network that implements octave convolution 728 processes the set of refined HF feature maps 724 and set of refined LF feature maps 726 to produce a final "combined" set of feature maps 730. The combined set feature maps 730 may be stored for processing at a later time, or sent to a feature classifier 740 where features in the feature maps are classified. For example, classified by semantic segmentation.

Figure 7C:
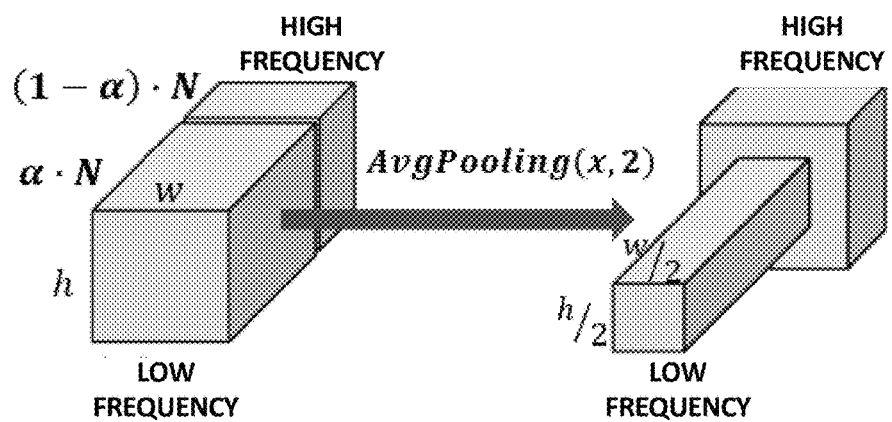
FIG. 7C illustrates an example of an aspect of a octave convolution layer where the low frequency feature maps can be compressed in a low resolution tensor by applying average pooling.
Figure 7D:
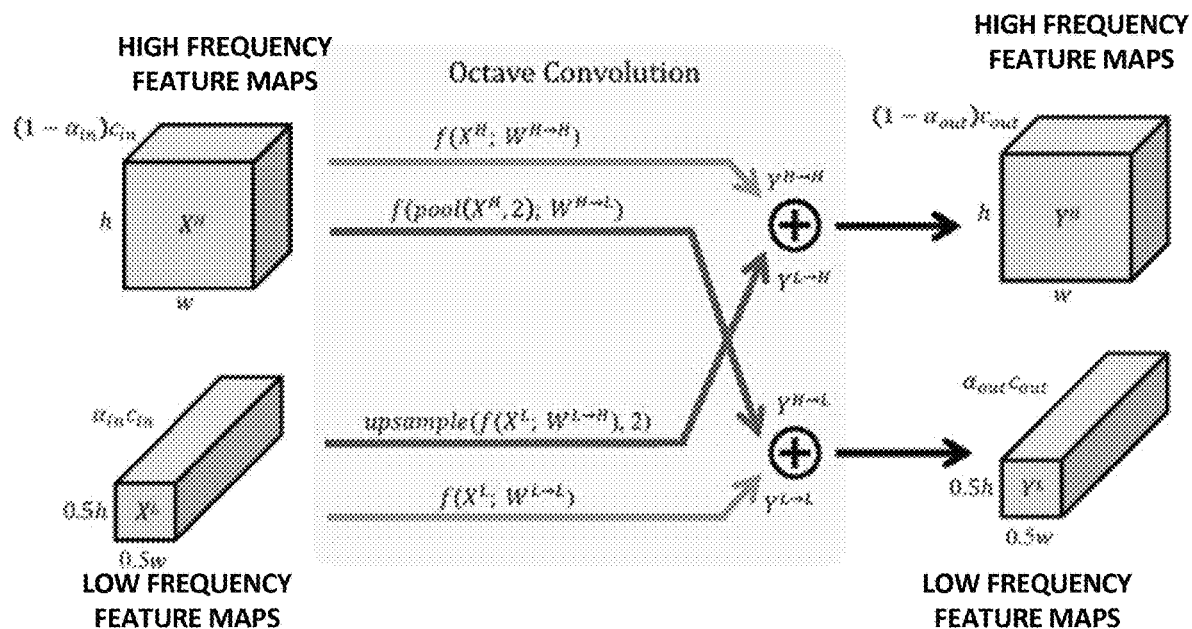
FIG. 7D illustrates an example of an implementation of octave convolution showing information exchange between the two frequencies.

FIG. 7C illustrates an example of a representation of decomposing the output feature maps 714 (FIG. 7B) into low-frequency feature maps and HF feature maps in an implementation of octave convolution. In other words, the output maps 714 of a convolution layer 716 can be factorized and grouped by their spatial frequency into HF feature maps 718 and LF feature maps 720. The multifrequency feature representation stores the smoothly changing, LF maps in a low-resolution tensor to reduce spatial redundancy. Octave convolution then operates directly on this representation (for example, the octave convolution one or more layers 722 and the octave convolution last layer(s) 728, as illustrated in FIG. 7B). Octave convolution processing can include exchanging information between HF and LF feature maps. That is, during processing, octave convolution can update the information of HF feature maps using context information from the LF feature maps, and/or update information of the LF feature maps using finer (higher resolution) details from the HF feature maps. FIG. 7D illustrates a representation of exchanging information between feature maps of different spatial resolution during octave convolution. During application of the machine learning model, processing of the feature maps can include a performing convolutions on the high frequency feature maps and receiving information from the low-frequency feature maps. Because of the spatial differences, feature information from the low-frequency feature maps is upsampled to have the same spatial resolution as the spatial resolution of the high-frequency feature maps, and then be used with the feature information from the high-frequency feature maps to form subsequent feature maps. Similarly, feature information from the high-frequency feature maps can be downsampled (e.g., via pooling) to have the same spatial resolution as the spatial resolution of the low-frequency feature maps, and then be used with the feature information from the low-frequency feature maps to form subsequent feature maps. This can be done, for example, in the octave convolution layer 722 and/or the octave convolution last layer(s) 728, according to various embodiments. In other words, during the octave convolution layer processing and/or at the end of the octave convolution processing (e.g., octave convolution last layer(s) 728, that is, layer-n to layer-n+1), the high frequency and low frequency feature maps can also exchange information by pooling (HF feature map information to LF feature map information) or via upsampling (LF feature map information to HF feature map information). This information exchange between can be characterized as follows:

High Frequency (layer-n) low (layer-n+1), use pooling+convolution

Low Frequency (layer-n) high (layer-n+1), use convolution+upsampling

High Frequency (layer-n) high (layer-n+1), use convolution

Low Frequency (layer-n) low (layer-n+1), use convolution

Figure 8:
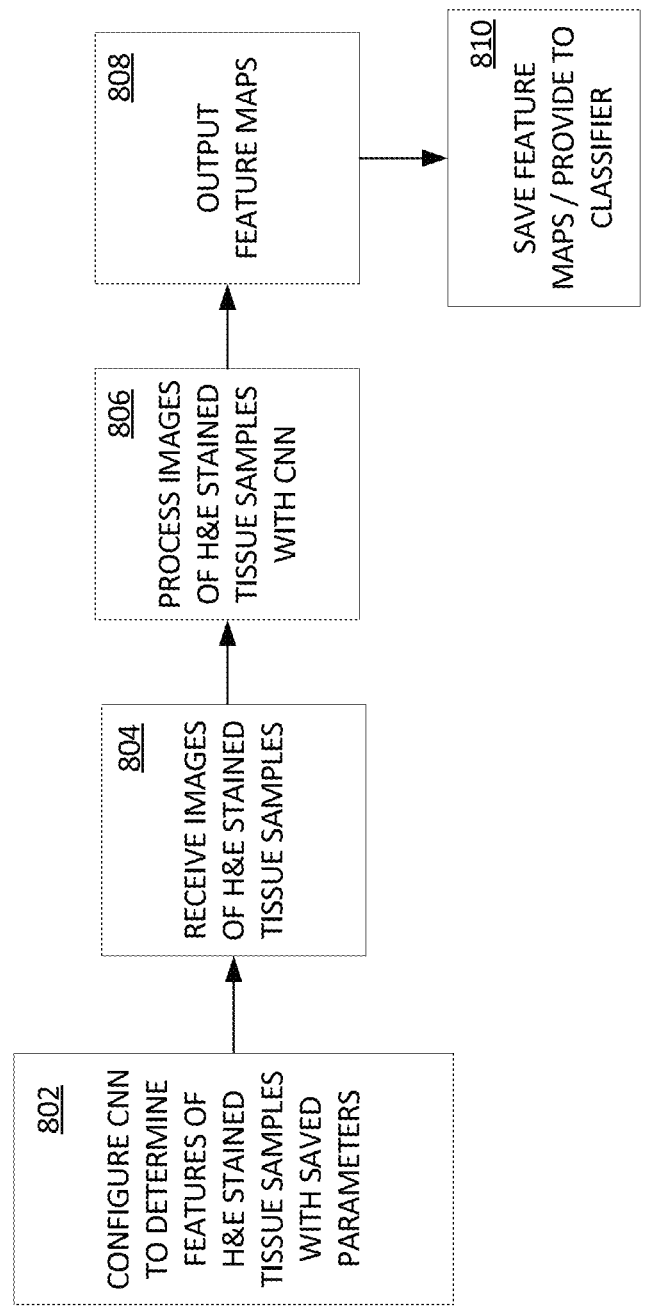
FIG. 8 illustrates an example of configuring a CNN with parameters derived from training using images of H&E stained tissue samples and then processing other images of H&E stained images and generating feature maps.

FIG. 8 illustrates an example of a process of configuring a CNN with parameters derived from training using images of H&E stained tissue samples and then processing other images of H&E stained images and generating feature maps. At block 802 previously derived CNN information can be retrieved from storage and used to configure a CNN for processing images of H&E stained tissue samples using octave convolution. Previously derived CNN information can be generated by, for example, the process shown in FIG. 7A, which can use the machine learning model processing illustrated in FIG. 7B for training. At block 804, one or more images of H&E stained tissue samples can be received. At block 806, the machine learning model processes the one or more images using the CNN configured for octave convolution. In some embodiments, processing the images of H&E stained tissue samples with a CNN configured for octave convolution processing uses the process described in FIG. 7B. At block 808 feature maps are output. At block 810, the feature maps can be stored and processed at a later time, or they can be provided to a classifier.

Figure 9:
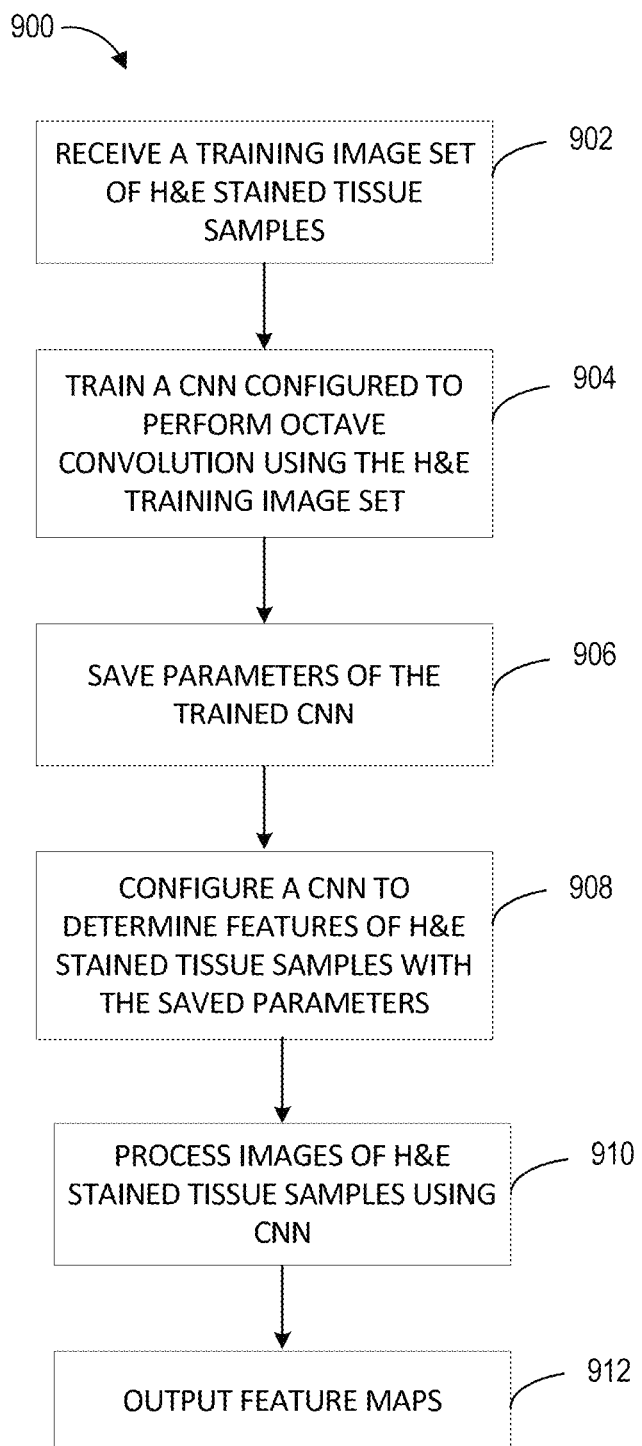
FIG. 9 illustrates an example of a process generating feature maps from H&E stained pathology images.

FIG. 9 illustrates an example of a process 900 for generating feature maps from H&E stained pathology images. In some embodiments, the computing system illustrated in FIG. 5 can be used to perform process 900. At block 902 process receives the training image set of H&E stained tissue samples. At block 904, the process trains a CNN configured to perform octave convolution using the H&E training image set. At block 906, parameters relating to the trained CNN are saved. At block 908, the process 900 computing system configures a convolutional neural network to determine the features of H&E stained tissue samples using the saved parameters from block 906. At block 910, the process 900 processes newly received images of H&E stained tissue samples using the CNN configured for octave convolution. In some embodiments, the process 900 processes the newly received images of H&E stained tissue samples using a CNN structure as shown in FIG. 7B. Finally at block 912, the process 900 outputs feature maps, which may then be stored, or sent to a classifier to classify structures and features in the feature maps. For example, in a case where semantic segmentation is applied to the feature maps to classify pixels in the H&E stained images, the classification may be used to provide an overlay on a display of an H&E stained image showing a user particular structures which were classified in the particular classes (e.g., tumors classified as benign, carcinoma, ductal carcinoma in situ, normal, or lobular carcinoma in situ). Other applications, such as flagging images which include features classified in particular classes (e.g., carcinoma, or other non-normal tumor class) for additional review, are also possible, and could be implemented based on this disclosure.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (e.g., top, bottom, side, up, down, inward, outward, etc.) are generally used with reference to the orientation shown in the figures and are not intended to be limiting. For example, the top surface described above can refer to a bottom surface or a side surface. Thus, features described on the top surface may be included on a bottom surface, a side surface, or any other surface.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods and materials of the present invention(s). This invention(s) is susceptible to modifications in the methods and materials, as well as alterations in the fabrication methods and equipment. Such modifications will become apparent to those skilled in the art from a consideration of this disclosure or practice of the invention(s) disclosed herein. Consequently, it is not intended that this invention(s) be limited to the specific embodiments disclosed herein, but that it cover all modifications and alternatives coming within the true scope and spirit of the invention(s) as embodied in the attached claims.

What is claimed is:

1. An apparatus for determining features in an image of a Hematoxylin and Eosin (H&E) stained tissue sample, comprising:
    a non-transitory computer readable medium configured to store executable instructions, and to store a H&E stained tissue sample image;
    one or more hardware processors in communication with the computer storage medium, wherein the executable instructions, when executed by the one or more hardware processors, configure the one or more hardware processors to:
        apply a machine learning model to the H&E stained tissue sample image, the machine learning model including at least a feature extractor network, wherein applying the machine learning process includes at least:
            performing convolution operations on the H&E stained tissue sample image to generate a plurality of initial feature maps;
            applying octave-convolution-first-layer operations on the initial feature maps to generate initial high-frequency feature maps and low-frequency feature maps;
            applying octave-convolution operations on the high-frequency initial feature maps to generate refined high-frequency feature maps;
            applying octave-convolution operations on the low-frequency initial feature maps to generate refined low-frequency feature maps; and
            applying octave-convolution last layer operations on the refined high-frequency feature maps and the refined low-frequency feature maps to produce combined feature maps.

2. The system of claim 1, further comprising determining classifications of the features in the combined feature maps.

3. The system of claim 2, wherein the classification comprises semantic segmentation.

4. The system of claim 1, wherein the spatial resolution of the initial low-frequency feature maps is ½ the spatial resolution of the initial high-frequency feature maps.

5. The system of claim 1, wherein the method further comprises performing pooling operations to generate the low-frequency feature maps.

6. The system of claim 1, wherein applying octave-convolution last layer operations on the refined high-frequency feature maps and the refined low-frequency feature maps to produce combined feature maps comprises pooling information from the refined high-frequency feature maps and the refined low-frequency feature maps to produce combined feature maps.

7. The system of claim 1, wherein applying octave-convolution last layer operations comprises exchanging information between the refined high-frequency feature maps and the refined low-frequency feature maps by pooling and upsampling.

8. The system of claim 1, wherein applying octave-convolution last layer operations on the refined high-frequency feature maps and the refined low-frequency feature maps to produce combined feature maps comprises providing information from at least one refined high-frequency feature map to a refined low-frequency feature map by pooling.

9. The system of claim 1, wherein applying octave-convolution last layer operations on the refined high-frequency feature maps and the refined low-frequency feature maps to produce combined feature maps comprises communicating information from at least one refined low-frequency feature map to a refined high-frequency feature map by upsampling.

10. The system of claim 1, wherein the machine learning process is implemented using a machine learning model comprising a convolutional neural network.

11. A method for determining features in an image of a Hematoxylin and Eosin (H&E) stained tissue sample using a machine learning model including at least a feature extractor network, the method comprising:
    performing convolution operations on the H&E stained tissue sample image to generate a plurality of initial feature maps;
    applying octave-convolution-first-layer operations on the initial feature maps to generate initial high-frequency feature maps and low-frequency feature maps;
    applying octave-convolution operations on the high-frequency initial feature maps to generate refined high-frequency feature maps;
    applying octave-convolution operations on the low-frequency initial feature maps to generate refined low-frequency feature maps; and
    applying octave-convolution last layer operations on the refined high-frequency feature maps and the refined low-frequency feature maps to produce combined feature maps,
    wherein the method is performed by one or more computer hardware processors executing program instructions stored on a non-transitory computer medium.

12. The method of claim 11, further comprises determining classifications of the features in the combined feature maps.

13. The method of claim 11, wherein the classification comprises semantic segmentation.

14. The method of claim 11, wherein the spatial resolution of the initial low-frequency feature maps is ½ the spatial resolution of the initial high-frequency feature maps.

15. The method of claim 11, wherein applying octave-convolution-first-layer operations on the initial feature maps to generate initial high-frequency feature maps and low-frequency feature maps comprises performing pooling operations to generate the low-frequency feature maps.

16. The method of claim 11, wherein applying octave-convolution last layer operations on the refined high-frequency feature maps and the refined low-frequency feature maps to produce combined feature maps comprises pooling information from the refined high-frequency feature maps and the refined low-frequency feature maps to produce combined feature maps.

17. The method of claim 11, wherein applying octave-convolution last layer operations comprises exchanging information between the refined high-frequency feature maps and the refined low-frequency feature maps by pooling and upsampling.

18. The method of claim 11, wherein applying octave-convolution last layer operations on the refined high-frequency feature maps and the refined low-frequency feature maps to produce combined feature maps comprises providing information from at least one refined high-frequency feature map to a refined low-frequency feature map by pooling.

19. The method of claim 11, wherein applying octave-convolution last layer operations on the refined high-frequency feature maps and the refined low-frequency feature maps to produce combined feature maps comprises communicating information from at least one refined low-frequency feature map to a refined high-frequency feature map by upsampling.

20. The method of claim 11, wherein the H&E stained tissue sample image is an image of a slide from a tissue block.

* * * * *